Patented Sept. 8, 1931

1,821,938

UNITED STATES PATENT OFFICE

WINFRID HENTRICH, OF WIESDORF-ON-THE-RHINE, AND EUGEN RIMELE, OF LEVER-KUSEN-ON-THE-RHINE, GERMANY, ASSIGNORS TO GENERAL ANILINE WORKS, INC., OF NEW YORK, N. Y., A CORPORATION OF DELAWARE

NEW AZO DYESTUFFS

No Drawing. Application filed September 30, 1927, Serial No. 223,236, and in Germany October 26, 1926.

The present invention relates to new azo dyestuffs containing a heavy metal, and to dyeings obtained therewith, more particularly to heavy metal compounds of the azo dyestuffs obtainable by combining a diazo compound of a 2-aminobenzene-1-carboxylic acid sulfonamide or a derivative or a substitution product thereof having most probably the following general formula:

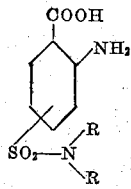

in which R stands for hydrogen, alkyl, aralkyl or aryl, with any coupling components. The heavy metal compounds of these azo dyestuffs can be prepared by treating the same in substance or on the fibre to be dyed with an agent which introduces a heavy metal, for instance with a salt of copper or chromium.

In accordance with the invention new and very valuable monoazo dyestuffs having most varied shades may be obtained according to the selection of the coupling component. When dyed on animal fibres and treated during or after the dyeing process in the usual manner with agents yielding metal such for example, as sodium dichromate in acid solution, or copper sulfate, the resulting shades are even, very fast to fulling, light and carbonizing.

When the azo dyestuffs obtained from 2-aminobenzene-1-carboxylic acid sulfonamides are treated in substance with an agent for introducing a heavy metal, dyestuffs containing metal are obtained, which are particularly well suited for the fast dyeing of animal fibres in an acid bath. The dyeings obtained with the new metallic compounds are very even. They possess moreover very good fastness to washing and fulling, as well as a very excellent fastness to light. On account of the combination of these properties, they are extraordinarily valuable. Many of the new metallic compounds may be used with advantage as pigment dyes, for example for the preparation of size colors.

The following examples serve to illustrate the principles underlying our invention, which appears applicable within very wide limits.

*Example 1.*—322 parts by weight of 2-aminobenzene-1-carboxylic acid-5-sulfo-2'anisidide are covered with water at 50° C. and treated with a sufficient quantity of ammonia for dissolving the sulfon-anisidide. An aqueous solution of 69 parts by weight of sodium nitrite is then added and the whole is caused to run slowly and with efficient stirring into an excess of cold dilute hydrochloric acid. The diazotization is complete after some time, and the diazo compound separates as a yellow precipitate. The suspension thus obtained is coupled in the usual manner with a solution of 224 parts by weight of 1-hydroxynaphthalene-5-sulfonic acid, prepared with sodium carbonate. When the formation of the dyestuff is complete, it is salted out, pressed and dried. It dyes wool in an acid bath a yellowish red shade. By after chroming, a Bordeaux red is obtained, which is very fast to light, fulling and carbonizing.

By replacing the 1-hydroxynaphthalene-5-sulfonic acid by 2-phenylamino-8-hydroxy-naphthalene-6-sulfonic acid, a dyestuff is obtained, which dyes wool in an acid bath a reddish brown, which is fast to light and fulling, and which by after chroming changes into a black brown possessing very great fastness to light, fulling and carbonizing.

2-aminobenzene-1-carboxylic acid-5-sulfo-2'-anisidide

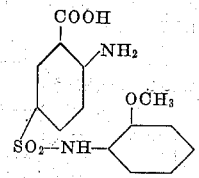

may be obtained, for example, from the product of the reaction between chloro sulfonic acid and 2-chloro-benzoic acid and decomposition with 2-anisidine in the presence of an agent, combining with the acid and by subsequently replacing the halogen in the nucleus by the amino group, by heating with ammonia under pressure.

*Example 2.*—292 parts by weight of 2-aminobenzene-1-carboxylic acid-5-sulfoanilide are diazotized according to the directions of Example 1. The diazo compound is coupled with a solution rendered alkaline with sodium carbonate, of 314 parts by weight of the pyrazolone from 2-amino-1-hydroxybenzene-4-sulfo-6-carboxylic acid. The new dyestuff dyes wool in an acid bath a reddish yellow shade. By chroming, a more greenish yellow shade is obtained, possessing very good fastness to fulling, carbonizing, potting and light.

Greenish yellow shades, fast to fulling and light, are also obtained, when wool is dyed with the above dyestuff in an acid bath in the presence of copper salts, or when wool dyed from the acid bath is subsequently treated with copper salts in the usual manner.

*Example 3.*—216 parts by weight of 2-aminobenzene-1-carboxylic acid-5-sulfonamide are diazotized according to the directions in Example 1. The diazo compound is coupled with 319 parts by weight of 1-acetyl-amino-8-hydroxy-naphthalene-3.6-disulfonic acid, rendered alkaline with sodium carbonate, and the dyestuff is isolated by salting out and pressing. It is then suspended in warm water at 50° C., rendered slightly acid with hydrochloric acid, and while stirring and warming to 70 to 80° C., a solution of 300 parts by weight of crystallized copper sulfate is added. The conversion into the copper complex compound is soon complete. The solution is neutralized with sodium acetate in the usual manner. The new copper compound dyes wool in an acid bath with a wine red coloration. The dyeing is very even and very fast to fulling and light.

*Example 4.*—The diazo compound obtained from 306 parts by weight of 2-aminobenzene-1-carboxylic acid-5-sulfo-4' toluidide is coupled with a solution of 224 parts by weight of 2-hydroxynaphthalene-8-sulfonic acid rendered alkaline with sodium carbonate. The separated dyestuff is again dissolved and subjected to the copper treatment as described in Example 3. It dyes wool in an acid bath a brownish orange shade of excellent fastness to light and fulling. The dyestuff dyes evenly. It has most probably the formula:

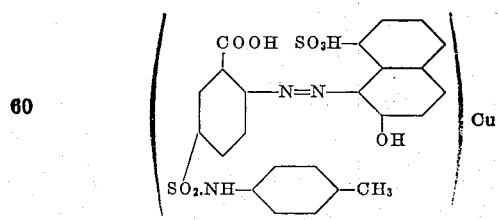

It is a brownish powder soluble in water with an orange coloration, yielding upon treatment with stannous chloride and hydrochloric acid 2-amino-1-carboxylic acid-5-sulfo-4'-toluidide, 1-amino-2-hydroxynaphthalene-8-sulfonic acid and cuprous chloride.

By substituting 1-hydroxynaphthalene-4-sulfonic acid for 2-hydroxynaphthalene-8-sulfonic acid, a dyestuff is obtained, the copper compound of which dyes wool a beautiful, very even copper red, possessing good fastness to washing and fulling, as well as an excellent fastness to light.

By replacing the 2-hydroxynaphthalene-8-sulfonic acid by 2-hydroxynaphthalene-6-sulfonic acid a dyestuff is obtained, the copper compound of which dyes wool in an acid bath in even, yellowish red brown shades, which are very fast to fulling and extraordinarily fast to light.

By using 3-methyl-1-(4'-sulfophenyl)-5-pyrazolone as coupling component, a dyestuff is obtained, the copper compound of which dyes wool in an acid bath in very even, greenish yellow shades which are very fast to light and fulling.

*Example 5.*—216 parts by weight of 2-aminobenzene-1-carboxylic acid - 5 - sulfonamide are diazotized and coupled in the presence of sodium acetate with an aqueous solution of 223 parts by weight of 2-aminonaphthalene-7-sulfonic acid. The separated dye is dissolved in water to form a concentrated solution. A concentrated solution of 460 parts by weight of chromium fluoride is then added, and the whole is heated under reflux, after the addition of some glass powder, until the beautiful reddish violet coloration ceases to increase in intensity; then evaporation is effected on the water bath to one half the volume, and the working up takes place in the customary manner. The dyestuff is obtained pure by redissolving and separating. The chromed dyestuff, when employed as a size color according to the customary process for producing pigment dyestuffs, produces red violet shades of excellent fastness to light.

A dyestuff from 2-aminobenzene-1-carboxylic acid-5-sulfonanilide and 2-aminonaphthalene-7-sulfonic acid is obtained in a strictly analogous manner. It dyes wool in an acid bath reddish orange and, after chroming, Bordeaux red shades, which are very fast to light and fulling. The chromium compound, when used as a size color, gives violet shades of excellent fastness to light.

We claim:
1. As new products, heavy metal compounds of the azodyestuffs obtainable from a diazocompound of a 2-aminobenzene-1-carboxylic acid sulfonamide and any coupling component, which products in the form of their dried and pulverized alkali metal salts are dark powders soluble in water, dye wool various fast shades, and yield upon treatment with stannous chloride and hydrochloroic acid a 2-aminobenzene-1-carboxylic acid sulfonamide, an amine and a heavy metal chloride.

2. As new products the azodyestuffs of the following probable formula:

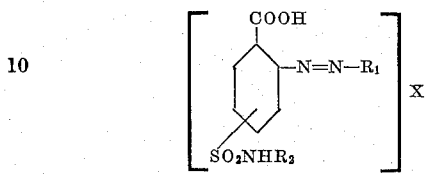

wherein $R_1$ stands for the residue of any coupling component, $R_2$ for an aromatic residue, and X stands for one of the heavy metals copper and chromium, which products in the form of their dried and pulverized alkali metal salts are dark powders, soluble in water, dye wool various fast shades and yield upon treatment with stannous chloride and hydrochloric acid a 2-aminobenzene-1-carboxylic acid sulfonamide, an amine and cuprous chloride or chromic chloride.

3. The new azo dyestuff having most probably the formula:

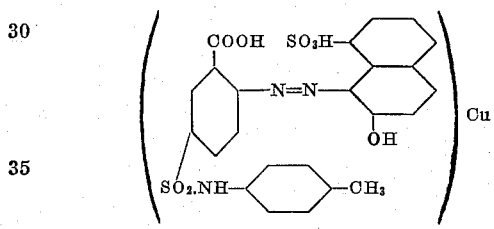

being a brownish powder soluble in water with an orange coloration, dyeing wool in an acid bath a brownish-orange shade fast to light and fulling, yielding upon treatment with stannous chloride and hydrochloric acid 2-amino-1-carboxylic acid-5-sulfo-4'-toluidide, 1-amino-2-hydroxy-naphthalene-8-sulfonic acid and cuprous chloride.

4. As new products fibres dyed with a heavy metal compound of an azo dyestuff obtainable from a diazo compound of a 2-aminobenzene - 1 - carboxylic acid sulfonamide and any coupling component.

5. As new products fibres dyed with an azo dyestuff of the following probable general formula:

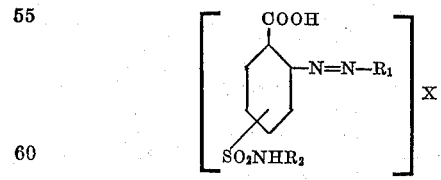

wherein $R_1$ stands for the residue of any coupling component, $R_2$ for an aromatic residue, and X stands for one of the heavy metals copper and chromium.

6. As new products fibres dyed with an azo dyestuff of the following probable formula:

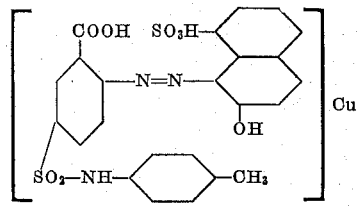

In testimony whereof we have hereunto set our hands.

WINFRID HENTRICH.
EUGEN RIMELE.